United States Patent Office 3,325,058
Patented June 13, 1967

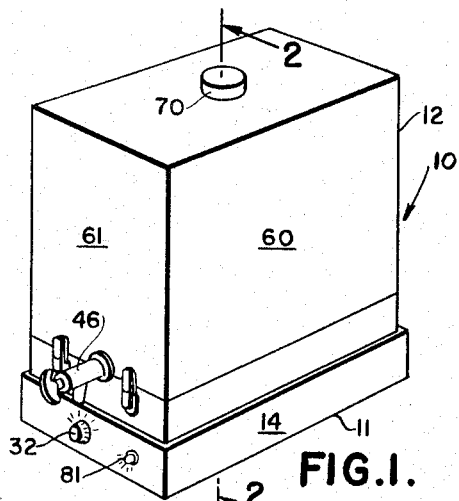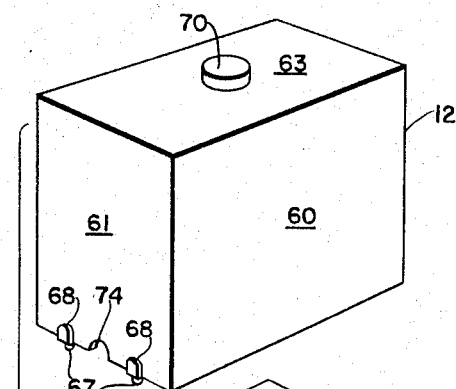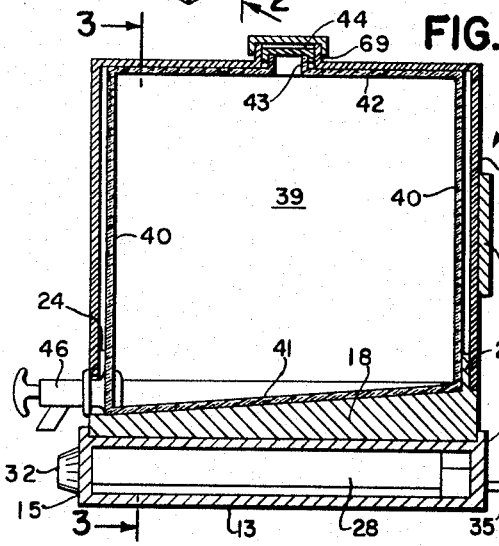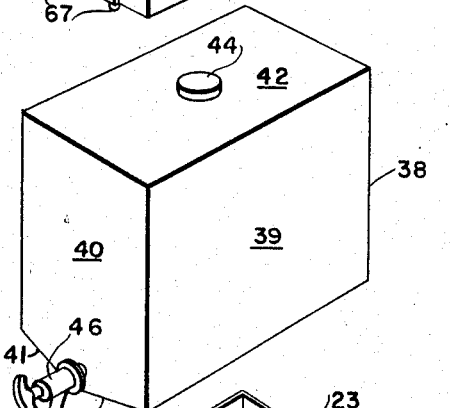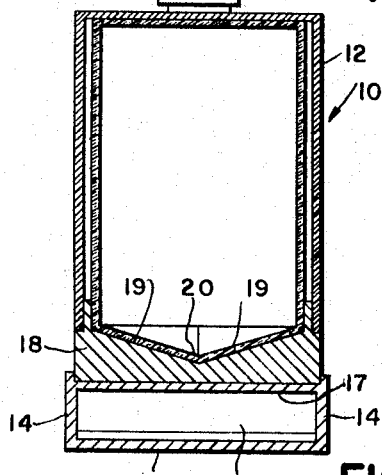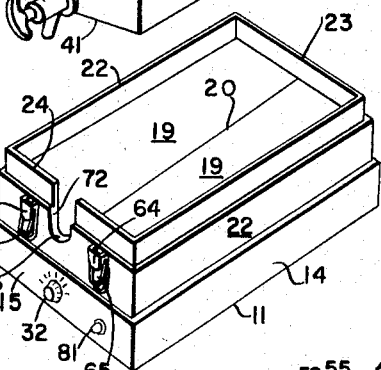

3,325,058
ELECTRICALLY HEATED RECEPTACLES AND
DISPOSABLE CONTAINERS THEREFOR
Junius Mosby West, Jr., 4005 Mill Creek Drive,
Annandale, Va. 22003
Filed Mar. 10, 1964, Ser. No. 350,731
3 Claims. (Cl. 222—146)

The present invention relates to improvements in electric heaters, and more particularly to an electrically heated receptacle and heating unit therefor for receiving a disposable liquid and beverage container, whereby said liquid and beverage can be maintained at an elevated temperature and the container discarded when the contents thereof are exhausted.

In the commercial air transport industry meals such as foods and beverages are served during plane flights to the passengers between various airport destinations on scheduled flights. These commodities are supplied to the aircraft industry by a caterer and are delivered in metal containers of various shapes and sizes. The liquids and beverages such as coffee, tea and the like are supplied in double wall metal containers which are shaped in such a manner as to be supported in a rack mounted on the counter of a service pantry in the aircraft.

The double wall metal containers are supported on the stainless steel counter of the service pantry, and are provided with electric heating elements having male connector prongs which are inserted in female coupling members in a vertical steel wall extending upwardly from the counter. Thus, upon delivery the liquid and beverage containers are supported on the counter with their male connector members electrically connected to the female wall socket members. These containers as used in present day catering services are bulky, heavy and difficult to handle. In addition, the containers are hard to clean after the contents have been dispensed, and in order to comply with various federal and state sanitation regulations the cleaning process is complex and expensive. The cost for cleaning present day containers of this type substantially equals the cost of the product and beverages contained therein.

The above objections and disadvantages are overcome by the present invention in which there is provided a two part receptacle including a lower and upper section which are separably connected, and are constructed to receive a disposable beverage container or the like formed of a thermo-setting resin material. The lower section being provided with male plug members adapted to be received in correspondingly positioned wall socket members in the stainless steel vertical wall (not shown) of the service pantry in a commercial aircraft. In accordance with the present invention, the caterer can deliver the beverage or liquid products in a ready to consume condition in the disposable container which is then inserted in the two part receptacle by the plane hostess or steward and can be discarded after the contents have been dispensed. Thus, the caterer will not be required to collect the exhausted containers as before for cleaning, since the upper and lower sections of the two part receptacle are not contaminated but remain in a clean and sanitary condition.

One object is to provide a two part receptacle adapted to be separably connected for receiving a disposable beverage container formed of a synthetic resin plastic material which will withstand elevated temperatures within the range of the boiling point of such beverages as coffee, tea and the like, and which can be disposed of when the contents thereof have been exhausted.

Another object is to provide an electrically heated receptacle unit as above, in which the disposable container is provided with a pouring spout adapted to be locked in position in said container so that operation of the same will not deform or mutilate the walls of said disposable container.

Another object is to provide an electrically heated two part receptacle, in which the lower part is provided with a thermostatically controlled electrical heating unit which can be easily adjusted and quickly connected to a source of electrical energy, while the upper section is provided with a permanent magnet on the rear wall thereof to engage the stainless steel vertical wall of the service pantry and hold the two part receptacle in position against displacement during various maneuvers of the aircraft.

Another object is to provide a two part electrically heated receptacle in which the sections are separably connected by yielding spring pressed hasp members secured to the lower section which engage laterally projecting hasps on the lower edge of the upper section in the form of keepers.

Another object is to provide a receptacle of the above-mentioned type in which the lower and upper sections are provided with opposed cut out portions for receiving a correspondingly formed portion of the dispensing spout of the disposable container to prevent the container from being deformed during operation thereof.

Another object is to provide a separable receptacle in which the upper wall is provided with diverging surfaces to mutually engage converging surfaces on the bottom wall of the disposable container.

Another object is to provide a thermostatic control in series with a simple circuit for maintaining the electric heating unit at a predetermined elevated temperature, and which will interrupt the circuit from the source of electrical energy through the heating unit or resistance element when the temperature thereof has reached a predetermined degree.

Other objects and advantages of the invention may become apparent during the course of the following description of the accompanying drawing, wherein:

FIGURE 1 is a perspective view of the electrically heated liquid and beverage container showing the manner in which the sections are separably connected with the pouring spout of the disposable container retained in position between the upper and lower sections of said receptacle.

FIGURE 2 is a vertical cross-sectional view taken on lines 2—2 of FIGURE 1 and looking in the direction of the arrows to illustrate the manner in which the disposable receptacle is mounted in the electrically heated container.

FIGURE 3 is a vertical cross-sectional view taken on line 3—3 of FIGURE 2 looking in the direction of the arrows and illustrating the interfitted connection between the sections of the receptacle and showing the manner in which the liquid and beverage container is supported between the upper and lower sections of the receptacle.

FIGURE 4 is an exploded view showing the electrically heated base, the disposable receptacle adapted to be supported thereon and the removable cover section for enclosing the disposable container.

FIGURE 5 is an enlarged vertical cross-sectional view showing a lower portion of the liquid and beverage container provided with a valved pouring spout constructed in accordance with the invention, and FIGURE 6 is a diagrammatic view showing the base portion of the receptacle and a simple series circuit for heating element and thermostatic control switch adapted to be connected to a source of electrical energy by the male coupling members.

In the drawing, and more in detail, there is shown a liquid and beverage receptacle generally designated 10 having a base section 11 and an upper section 12. The receptacle 10 including the base and upper section is constructed on stainless steel to comply with various regulations and to enable the receptacle to be maintained in a sanitary condition.

The base 11 is hollow and includes a bottom wall 13 having upstanding side walls 14 connected by front and rear vertical wall portions 15 and 16. A top wall 17 connects the side, front and back walls and is inset to form a recess for receiving a thickened plate member 18 adapted to dissipate heat and prevent damage to the liquid and beverage container. The thickened plate member 18 is removably secured to the top wall 17 by threaded fasteners or other securing elements (not shown), and is thus permanently attached to the base member 11. Said thickened metal plate 18 is provided with converging wall surfaces 19 which meet along a center line 20, and said converging surfaces are on a compound angle so that they slope in a direction forwardly toward the front wall 15 of the base member 11 (FIGURE 2). Formed on the relatively thick metal plate 18 and extending upwardly therefrom along the sides are vertical wall portions 22 connected to the rear by a similar vertical wall portion 23 and at the front or forward portion by means of a vertical wall 24. The vertical wall portions 22, 23, and 24 are vertically offset from the wall portions 14, 15 and 16 of the base member 11 as clearly shown in FIGURE 4. The wall surfaces 19 diverge in a direction upwardly and converge in a direction downwardly for a purpose which will be hereinafter more fully described.

An electric heating element of the Calrod or resistance wire type 28 is mounted in the base 11, and as shown in the diagrammatic view in FIGURE 6 the electrical heating element 28 is in a simple series electric circuit 29 which includes a rheostat 30 and a thermostatic control switch 31 controlled by a knob 32 which is rotatably mounted in the front wall 15 of the base member 11. The series circuit is electrically energized from the direct current supply from the aircraft and is connected to terminal prongs 35 supported in the rear wall 16 and suitably insulated therefrom. The base member 11 is adapted to be supported on the counter of a service pantry in an aircraft which is provided with a rear wall having outlet sockets of conventional design (not shown) into which the male terminal prongs 35 are inserted. The thermostatic switch 31 is also of conventional design and is normally closed until the temperature in the area of the electric resistance heating element 28 approaches a predetermined degree, at which time it interrupts the circuit 29 and deenergizes the electrical heating element 28.

The disposable beverage and liquid container 38 is formed of a plastic material of the synthetic resin type or various compositions thereof including thermo-setting phenol condensation products such as Teflon, suitably shaped and formed to provide side walls 39 connected by end walls 40 and having a bottom wall shaped to provide downwardly diverging wall portions 41. A top wall 42 completes the structure to provide a closed container, and said top wall is provided with a threaded spout 43 for receiving a closure cap 44 threaded in place on the vent or the threaded spout 43.

Formed integral with the front end wall 40 of the container 38 is a pouring spout 46 (FIGURE 5). The lower edge portion of the front wall 40 is enlarged as at 47 and the pouring spout 46 is integrated therewith. This structure reinforces the lower area of the disposable container 38. The pouring spout 46 includes a cylindrical portion 48 in communication with a bore 49 through the enlarged wall portion 47, and the spout 50 is provided with a bore 51 which communicates with an enlarged bore 52 in the cylindrical portion 48. A closure plug 53 is mounted in the enlarged bore and slidably receives a valve plunger 54 having a valve plug 55 on its inner end adapted to be yieldingly urged into engagement with a valve seat 56 by means of a spring 57 which encircles the valve rod 54 and has one end in engagement with the plug 53, while the opposite end engages the valve head 55 to hold the same in its operative position. The outer end of the valve rod 54 is provided with an actuating handle 59 to permit the valve to be opened so that the contents of the disposable container 38 may be dispensed through the nozzle 51.

The upper section 12 is provided with side, front, rear and top walls 60, 61, 62 and 63 respectively to form an upper detachable section for the receptacle the dimensions of which are slightly greater than the dimensions of the disposable container 38 to permit the same to be slid downwardly over the disposable container 38 in such a manner that the lower edge will overlap the side walls 22 as well as the rear and front walls 24 of the thickened metal plate 18 and form a sliding snug fit therewith. The front wall 15 of the base 11 is provided with latch type hasp members 64 having swinging hasps 65 which are spring urged in a conventional manner to snap into a locked position when the same are swung upwardly from the position shown in FIGURE 4 to the position shown in FIGURE 1. The hasp members 64 are provided with sockets for receiving downwardly extending projections 67 formed integral with the keeper members 68 secured to the front wall 61 of the separable upper section 12. The rear wall 62 of the metal receptacle 12 is also provided with keeper members 68 which are engaged by hasp members on the rear wall 16 of the base 11. Since the structure of both sets of separable hasp fasteners is identical, a description of one set will suffice for both.

The top wall 63 of the separable receptacle section 12 is provided with a threaded vent opening 69 having a closure cap 70 threaded thereon, and the vent opening 69 is slightly larger in diameter to permit the cap 44 of the vent opening 43 to be received therein.

The front wall 15 of the base 11 and its upstaanding wall portion 24 is provided with a cut away slot 72 having a rounded lower portion 73 (FIGURE 4) and the upper separable receptacle section 12 has its front wall 61 provided with a correspondingly shaped cut away portion 74 to form a restricted opening for the passage of the pouring spout 46. An annular flange 75 is formed on the pouring spout 46 to provide an annular recess 76 for receiving the cut away portions 73 and 74 of the base member and removable upper receptacle section 12. Thus, the lower portion of the front wall of the liquid and beverage container 38 is clamped in position when the base section and upper receptacle section are secured together and fastened in place by the hasp loops 65 passing over the keeper members 68. This structure prevents damage and mutilation to the disposable container 38 when pressure is exerted upon or pull force applied to the handle 59. Such pressure and force will be applied to the upper edge of the base 11 and the lower edge of the receptacle 12.

Secured to the rear wall 62 of the upper receptacle section 12 is a permanent magnet 80 which is secured in place by threaded fasteners or the like (not shown), and said permanent magnet is preferably of the type formed of a composition metal alloy including cobalt, nickel and aluminum known in the art as Alnico. The permanent magnet 80 is adapted to engage the stainless steel vertical wall of the aircraft service pantry and hold the assembly in place. Thus, when the aircraft banks for a turn in a direction such that the counter slopes downwardly, the permanent magnet 80 will maintain the assembly against displacement. A similar magnet 80a may be secured to the base as shown in FIGURE 6, as well as to the upper receptacle section 12.

In use, the base 11 is supported on the counter in the service pantry of a commercial aircraft, with the prongs 35 of the separable connector received in correspondingly positioned electrical socket members in the vertical wall of the aircraft. The container 38 is delivered to the airport of the particular airway filled with a liquid beverage such as coffee, tea or cocoa. When the container 38 or cartridge filled with a liquid beverage is delivered the upper section 12 of the receptacle is removed and the container 38 placed in position with its downwardly converging walls 41 resting upon the downwardly converging walls 19 of the relatively heavy metal plate 18. This centers the container or cartridge 38 with respect to the base and aligns the spout 46 in registry with the cut out opening 72 so that the same will slide therein without being mutilated or deformed. Thus, the container 38 or loaded cartridge is held in place by mutually engaging tapered walls which assist in properly placing the container cartridge 38 in its proper position. The cover 12 is then lowered over the container 38 and the hasp fasteners 65 are swung into position over the keepers 68 with the pouring spout 46 in alignment with the notch 74. When the flange 75 is aligned parallel with the front wall 24 of the container 12 of the receptacle the spout 46 is held in place by the edge surfaces of the notches 73 and 74 engaging within the annular recess 76.

After the contents of the container cartridge 38 have been dispensed during the airway flight, the receptacle cover 12 is removed and the container 38 displaced and discarded by suitable disposal means. The container 38 cannot be conveniently used after disposal, since the downwardly converging walls 41 prevent the container from being maintained in an upright position if an attempt is made by an unauthorized person to use the container and to refill the same with other liquids.

During the airway flight the liquid contents of the container 38 are maintained at an elevated temperature by the heating element 28 which can be preset by manipulating the rheostat 30 to maintain the contents at a predetermined temperature. The rheostat 30 is mounted within the base 11 and the contact arm thereof is provided with a control knob 80 mounted adjacent the thermostatic control knob 32.

If desired, an ordinary pet cock may be used in lieu of the valved spigot shown in FIGURE 5. Such a stucture would include a tubular portion similar to the cylindrical housing 46 with its outer end closed and provided with a transversely extending plug having a radial bore communicating with an axial bore passing through the tubular portion and forming a spout. The rotary plug would, of course, be provided with a handle to move the radial bore into and out of registry with the bore of the tubular portion.

Various types of synthetic plastics can be used in forming the container 38. For instance, different types of thermoplastic and thermo-setting plastic compositions can be used such as methylmethacrylate, cellulose acetate, cellulose butyrate, ethyl cellulose, polyvinyl chloride, and any of the plastic compositions from the lower alkyl alcohols such as methyl, ethyl, propyl, butyl or amyl. The plastic may be of a variety of forms such as of very thin section, and may be cast by a blowing process in a suitable mold of a corresponding shape. The main consideration in selecting an appropriate plastic material resides in the selection of one which will withstand temperatures above 200° F. in the neighborhood of the boiling point of the liquid beverage. It has been found that synthetic plastic material sold under the trademark Teflon (a polyvinyl alcohol derivative) will withstand temperatures above 200° F. without undergoing deformation or being considerably affected.

Teflon is poly tetrafluorinated ethylene resin composition.

The wall thickness of the container 38 may range from 3/16 of an inch to 1/4 inch depending upon the type of plastic composition employed, but in the neighborhood of the pouring spout 46 the wall thickness is increased to approximately twice the wall thickness of the remaining section. This structure reinforces the area adjacent the pouring spout 46 and provides sufficient material to form an annular channel or groove 76 between the container wall and the annular flange 55 on the pouring spout. In lieu of the permanent magnet 80 an electromagnet can be used in the base connected in the simple series circuit 29 of the heating element 28.

It is to be understood that various changes can be made with respect to wall thickness of the container 38, and in the arrangement of the electric heating element and its circuit without departing from the spirit of the invention or the scope of the subjoined claims.

What is claimed is:

1. In an electric heater for use on commercial aircraft having a service counter extending from a vertical wall, and in which said wall is provided with an electrical outlet fitting, comprising a base having a chamber, a cover detachably secured to said base providing a chamber therebetween, said base being provided with an upstanding wall having a cut away portion, said cover having its lower edge provided with a cut away portion in registry with the cut away portion in said vertical wall, a disposable plastic container having a pouring spout adjacent its lower portion adapted to be received in said second named chamber and supported on said base with the pouring spout extending through said opening, an annular recess in said pouring spout to receive the edges of said cut away portions and secure said pouring spout in position against displacement, an electric heating unit mounted in said base, male contact prongs mounted on said base electrically connected to said heating unit and adapted to be inserted in an electric wall outlet fixture, said base and container being provided with downwardly converging inclined wall portions forming mutually engaging tapered surfaces to maintain said container in a centered posiiton.

2. In an electric heater for beverages in accordance with claim 1 in which said pouring spout is provided with a spring seated control valve.

3. In an electric heater for beverages in accordance with claim 1 in which one wall of said receptacle cover is provided with a magnet which will hold said electric heater in position when the same is supported on said counter with the magnet in engagement with said vertical wall.

References Cited

UNITED STATES PATENTS

| 1,112,218 | 9/1914 | Flynn | 219—433 |
| 2,215,688 | 9/1940 | Chamberlain | 219—214 |
| 2,293,764 | 8/1942 | Roeder | 219—214 |
| 2,861,171 | 11/1958 | Adler | 219—214 |

ROBERT B. REEVES, *Primary Examiner.*

F. R. HANDREN, *Assistant Examiner.*